Dec. 27, 1955     D. LABINO     2,728,699
GLASS PAPER
Original Filed Nov. 12, 1952     2 Sheets-Sheet 1
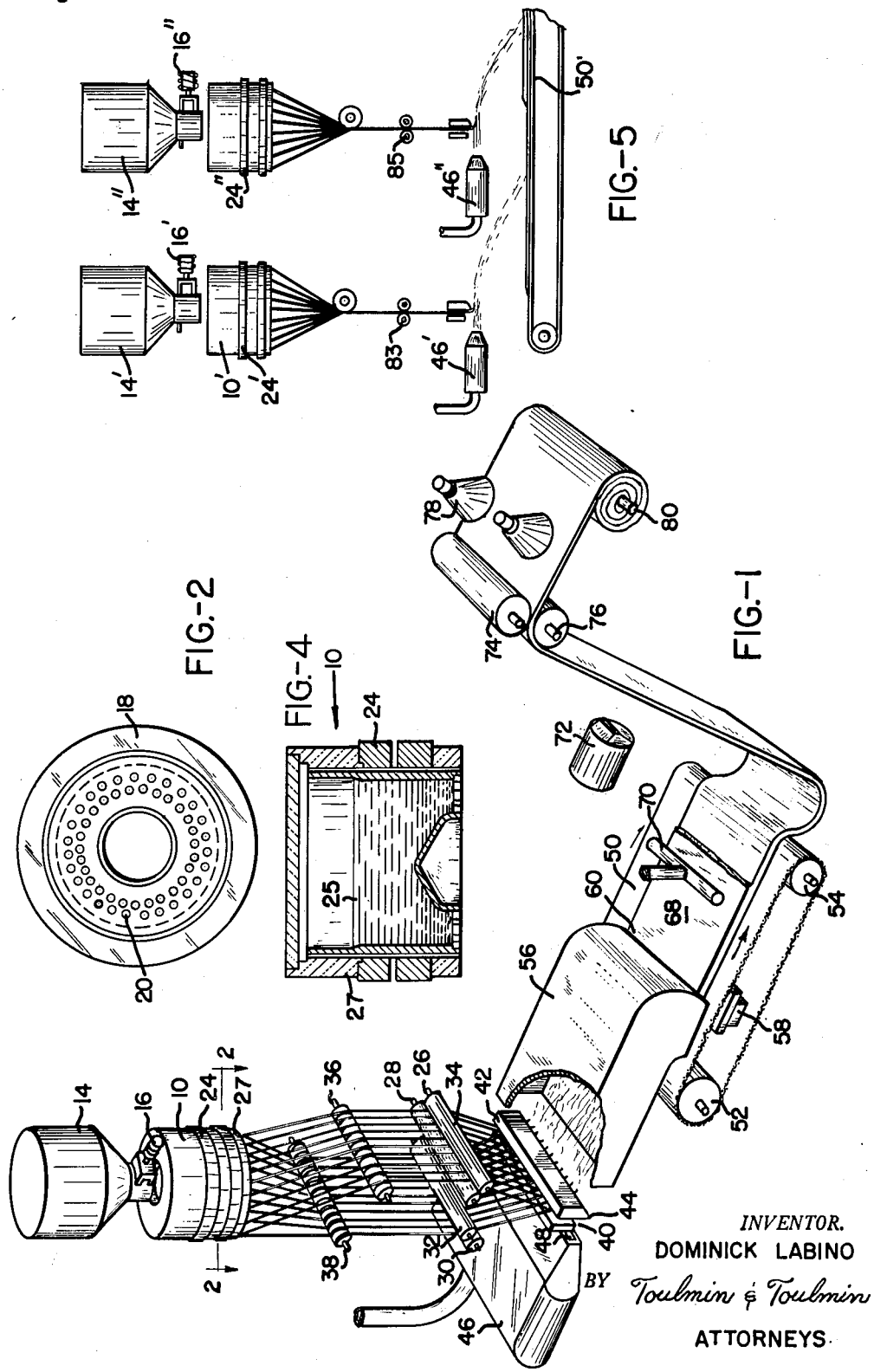
INVENTOR.
DOMINICK LABINO
BY Toulmin & Toulmin
ATTORNEYS

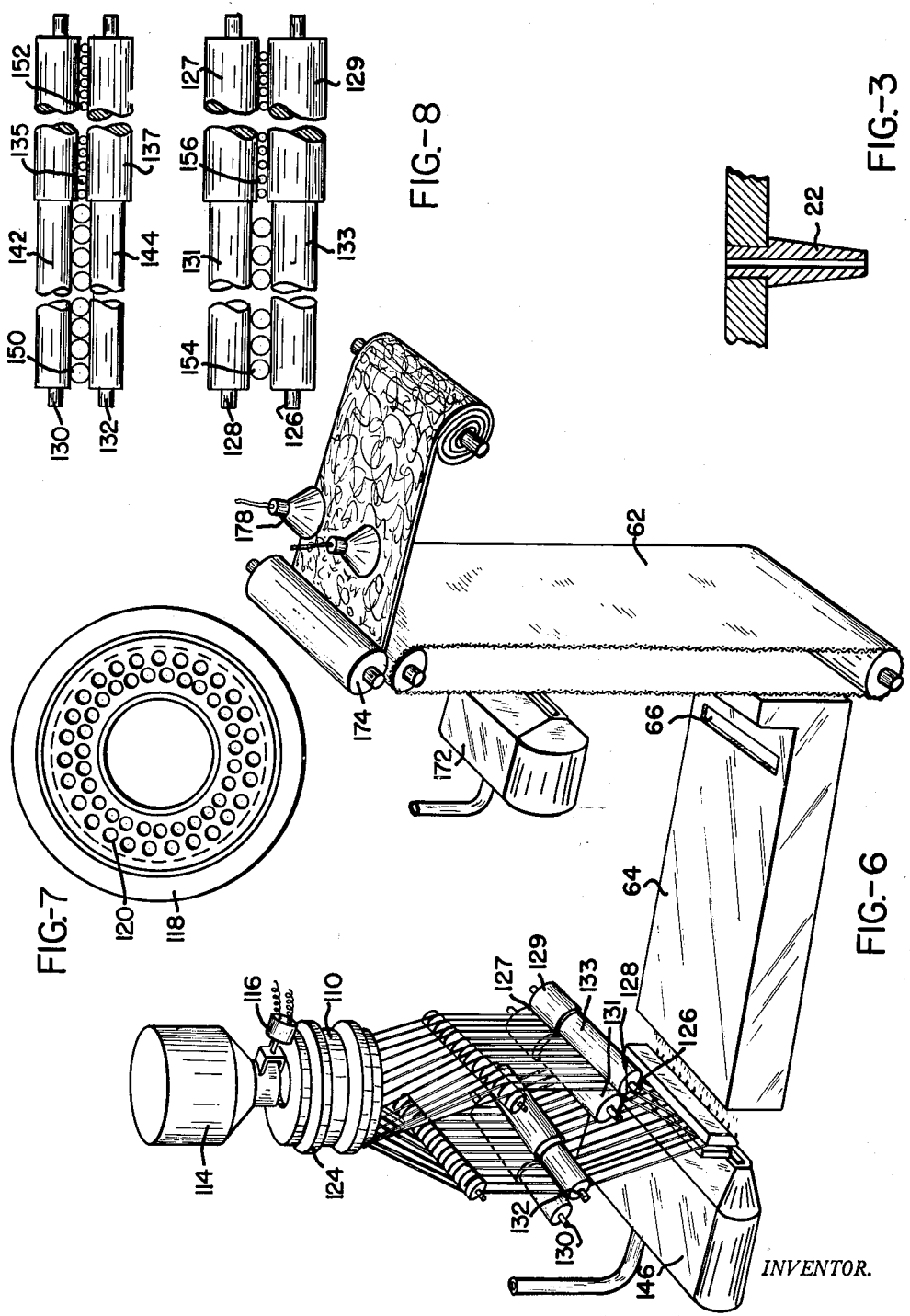

United States Patent Office 2,728,699
Patented Dec. 27, 1955

2,728,699

GLASS PAPER

Dominick Labino, Waterville, Ohio, assignor, by mesne assignments, to L. O. F. Glass Fibers Company, Toledo, Ohio, a corporation of Ohio Original application November 12, 1952, Serial No. 320,076. Divided and this application November 23, 1953, Serial No. 393,652

3 Claims. (Cl. 154—46)

This invention relates to glass paper and to methods of producing the same; more particularly this invention relates to a paper in which the glass fibers constituting the paper have a plurality of diameters.

This application is a division of Dominick Labino application, Serial No. 320,076, filed November 12, 1952.

Glass fibers having a diameter of one micron or less, hereinafter termed "submicron" diameters or "submicron" fibers have been produced on a production basis as described in co-pending application of Dominick Labino, Serial No. 273,012, filed February 23, 1952, and assigned to the same assignee as the present invention. Such fibers have been shown to be useful in the production of glass paper as described in Dominick Labino applications as follows: Ser. No. 247,010, filed September 17, 1951; Ser. No. 256,930, filed November 17, 1951; Ser. No. 256,977, filed November 19, 1951; Ser. No. 258,211, filed November 26, 1951; Ser. No. 276,389, filed March 13, 1952; all assigned to the same assignee as the present invention.

The characteristics of the glass paper products described in those applications render them particularly useful in electrical applications, chemical applications, as filters for smoke-laden air, sound insulation and so forth. It has been considered desirable however to increase the tensile strength of these papers above the 220# per square inch in a dry condition disclosed in co-pending application Serial No. 247,010 referred to hereinbefore.

Accordingly a primary object of the present invention is to provide a novel glass paper of improved tensile strength.

Another object of the invention is to set forth methods of producing a glass paper of improved tensile strength.

These and other allied objectives of the present invention are attained by subjecting primary glass fibers of varying diameters to a high temperature, high velocity gas blast whereby the primary fibers are blown into submicron diameter fibers of varying diameters. The fibers are collected into a mat in which the fibers are so arranged that fibers of each diameter will have a complete or universal orientation in the mat. Thereafter the fiber mat is wetted, compressed and dried to a paper like sheet having a thickness of about 0.005 inch.

The increased tensile strength of the paper thus formed is considered to be due to the fact that fibers of varying diameter which were present in the mat readily interlock upon compression; further when a tensive stress is applied to such a paper it is considered that the variable size fibers key or lock together to prevent undue extension and fracturing of the paper.

The submicron diameter fibers of the paper thus described may be produced in several ways but it is preferred to form the primary filaments into a substantially planar group and to expose them to the gas blast simultaneously; with this mode of operation the larger size primary fibers will suffer less attenuation than the smaller fibers but all the attenuated fibers will be of submicron diameter.

Alternatively several gas blasts may be employed operating concurrently but on different size primary fibers, the blown fibers produced from the separate blasts being collected on a common surface to achieve the mat of complete fiber orientation.

The invention will be more fully understood by reference to the detailed description and the accompanying drawing wherein:

Figure 1 schematically illustrates apparatus useful in the process of invention including a glass melting pot;

Figure 2 is a bottom view of the aperture plate of the melting pot taken on line 2—2 of Figure 1;

Figure 3 is a sectional view of a nipple useful in the aperture plate for controlling primary fiber diameter;

Figure 4 is a cross-sectional view of one form of melting pot including an aperture plate;

Figure 5 illustrates a further embodiment of the invention;

Figure 6 illustrates another embodiment of the invention;

Figure 7 illustrates an aperture plate useful with the structure of Figure 6; and Figure 8 illustrates drawing rolls useful with the apparatus of Figure 6.

Referring to the drawings there is shown in Figure 1 a glass melting pot 10 of platinum or suitable alloy for the heating and melting of glass marbles which are fed from hopper 14 in response to the actuation of solenoid 16 which is itself governed by the depth of molten glass in the pot. Accordingly a constant glass level is maintained in pot 10.

The lower end of pot 10 terminates in an aperture plate 18 having approximately 150 holes the arrangement of which is most clearly indicated in Figure 2. The apertures 20 of the plate may be of a uniform size but are adapted to receive open ended nipples 22 (Figure 3) which may have internal diameters of varying sizes. Thus the nipples may be chosen to provide primary glass filaments which range in size from 0.002 to 0.007 inch. Alternately as will be described hereinafter the nipples may all be of one size and the rate of drawing the filaments may be varied to secure the various sizes of primary filaments. While a structural arrangement of the aperture plate and nipple is presently known which produces primary fibers or filaments of a given size, it has not so far as is known been suggested to produce multiple size filaments from a single pot.

The pot as indicated in Figure 4 is circular and the circular aperture plate (Figure 2) is provided with a plurality of concentrically arranged apertures adjacent the periphery thereof. Induction heating coil 24 (Figures 1 and 4) suitably adapted for connection with a source of high frequency energy is placed around the pot at substantially the glass melting level 25 and the pot (Figure 4) is provided with insulation, as ceramic material 27. As disclosed in copending application Serial No. 273,012, filed February 23, 1952, assigned to the same assignee as the present invention, such an arrangement contributes to the production of uniform primary filaments.

Positioned below the glass melting pot 10 are two sets of shafts 26, 28 and 30, 32 driven by suitable means (not shown) and upon which are mounted drawing rolls as indicated generally at 34. In the operation of the apparatus the primary filaments pass between and are drawn by the drawing rolls. In the practice of this invention the shafts 26, 28 are driven at one speed and the shafts 30, 32 at a higher speed. High drawing rates normally produce smaller filaments and consequently the combination of variation in drawing rate with changes in aperture size permit a high degree of controlled variation in the primary filament.

Snubber shafts 36, 38 are positioned between the pot and drawing rolls and serve with the drawing rolls to align the filaments or primary fibers into a single plane. The snubber shafts are grooved to receive the fibers and are preferably driven to avoid undue and impositive frictional effects.

The primary fibers pass from the drawing rolls and are advanced thereby over the flat face 40 of a guide block 42 having a V-shaped forward edge 44; the fibers as they approach edge 44 it will be noted are in a substantially vertical planar arrangement.

In horizontal alignment with edge 44 is a gas burner 46 having a discharge slot 48 through which a high temperature high velocity gas blast may be discharged at the ends of the glass fibers as they pass edge 44. The heat of this blast causes the ends of the fibers to be melted and the force of the gases causes the molten glass of each of the fibers to attenuate into very fine diameter fibers—that is fibers having a diameter of one micron or less. Blast conditions which occasion this effect include gas temperatures of about 3300° F. and blast velocities of 1600–2000 ft. per second, with the primary fiber diameter having a range of 0.002 to 0.007 inch. The rate of feed while a consideration is not critical and need not be uniform in feet per minute of vertical travel for all primary fibers. Since the melting rate of the large diameter fibers will be somewhat slower than the others the speed should in general be predicated upon the melting time of the larger diameter fiber.

The glass blown into submicron diameter fibers must for the attainment of the objectives of this invention be so collected into a mat form as to provide a complete or substantially uniform orientation of the submicron fibers of different diameters. Thus fibers blown from a primary fiber or filament having a diameter of 0.002 inch may attain a diameter in the blown fiber form as low as 0.04 micron while primary fibers of a diameter of 0.007 result under the conditions stated of blown fibers having a diameter of up to one micron. The fibers of 0.04 micron for example must in the mat extend in all directions and similarly for those of other diameters.

To attain this complete or universal orientation the collecting means may be positioned at a sufficient distance from the blast as to permit the staple fibers to be jockeyed out of a straight line flow by eddies in the gases of the blast; thus the collecting means may itself preferably be a foraminous belt 50 mounted on pulleys 52, 54 and driven by suitable means (not shown) in the direction of the arrow (Figure 1). A hood 56 may be positioned over the upper strand and a suction box 58 may be mounted at the end of the hood beneath the upper strand to draw the staple to the belt. The downwardly depending end 60 of the hood 56 may be employed to receive a large proportion of the blown material and to direct it to the belt, or it may be sufficiently distant from the blast to merely serve as a stop in which case it will play substantially no part in fiber orientation.

As illustrated in Figure 6 the foraminous belt as 62 may pass vertically upward, the fibers passing through hood 64 being subjected to a slight draft through opening 66 to induce complete orientation.

Referring again to Figure 1 the fibers on the horizontal belt 50, formed into mat 68, pass from beneath the hood 56 under a water spray 70 which condenses the loose fibrous mat into a wet felted mat of reduced thickness; when compacted as described the wet material has, due to the homogeneous web structure and the interlaced fibers of varying diameter, a very considerable strength, and may be readily handled or pressured to a thinner paper form without destructive results.

Accordingly to form the paper the continuous length mat is passed before a heater 72 to partially dry the material before it enters between press rolls 74, 76; the pressured material is then dried preferably under infrared light as at 78 and then reeled as at 80.

The product thus attained is a true paper having a thickness of only about .005 inch, which however as may be readily noted involves a considerable number of individual fibers of submicron diameter in order to attain this thickness. The tensile strength of such a paper in both the dry and wet condition, due to the interlocking and keying of the fibers of different diameters, will be improved materially.

Figure 5 illustrates another embodiment of the inventive process wherein a plurality of filament forming units and gas burners are employed; in this figure the same (where applicable) numerals as used in Figure 1 are employed with the exception that primes and double primes are utilized. In this instance the filaments fed to a given burner may be of a single size and the collecting means may be so positioned as to receive the staple fiber of one size and then the staple of another submicron size; it is of course possible here also to feed several sizes of primary filaments to each burner if desired. The product attained in this instance may however have slightly different surface conditions on opposing sides since the predominant fiber size on each side will be different. The fiber orientation however will still be substantially complete, the paper strength greater than that hitherto known and about the same as that of the product previously described herein.

With the employment of this latter embodiment or modifications thereof using plural filament systems care should be exercised in the positioning of belt 50' in order to obtain the desired orientation of fibers of all sizes; otherwise the apparatus and process is similar to that described in connection with Figure 1, except that only one set of drawing rolls designated at 83 and 85 respectively is required for each device.

The embodiment of Figure 6 is particularly useful where the size of the nipples 120 in the aperture plate 118 is uniform as set out in Figure 7. The globules of molten glass forming at these nipples normally would be very uniform and would produce with normal drawing primary filaments of uniform size from pot 110 which is fed from hopper 114 with glass marbles, upon actuation of solenoid 116. However since it is desirable to supply filaments of several different diameters in planar arrangement to the blast from the burner 146 a novel arrangement of drawing rolls is provided to serve this purpose.

Thus shafts 126 and 128 like shafts 26 and 28 of Figure 1 have members 127, 129, 131 and 133 of resilient material mounted thereon but in this instance the diameters vary slightly to accommodate different size primary filaments; that is the portions 127 and 129 have a greater surface speed than the portions 131 and 133 since the speeds of the shafts 126 and 128 are equal. The higher drawing speed between portions 127 and 129 will result in a smaller primary filament from a given glass globule as compared with that attained between portions 131 and 133. The variation in roll diameter of course need only be very slight since filaments under consideration vary only between 0.002 and 0.007 inch. This arrangement permits the feeding to the flame of the burner filaments of a plurality of sizes since the filaments passing between the rolls 135, 137 and 142, 144 on shafts 130 and 132 may vary as desired and the shaft speeds themselves may be variable.

Accordingly as indicated in Figure 8 four sizes of filaments may be produced as at 150, 152, 154 and 156; the only essential requirement in this connection is that the feed speed and flame as stated hereinbefore, be capable of producing micron or submicron diameter fiber.

The product of invention whatever apparatus is employed is advantageously produced having fibers in a definite ratio of diameter sizes. Thus some of the fibers may have a diameter of approximately one micron while others have diameters of 0.75, 0.50 and 0.25 inch. The fibers of a given paper may be even multiples, that is, 0.25, 0.50 and one micron or may be odd multiples as 0.25 and 0.75 or both odd and even as indicated hereinbefore. The primary fiber diameter may of course vary slightly from a given mean and this variation will be reflected to a slight extent in the blown fiber but is not sufficiently critical to affect the desired result.

The length of the blown fibers will be at least 500 to 1000 times their diameters, a factor which assists in attainment of the universal orientation. The relatively long fiber length also induces some doubling of the individual fibers which aids the distribution and keying effect.

The long traverse in hood 64 of Figure 6 is particularly efficacious in this respect and the paper resulting from the partially drying by heater 172, the compression by rolls 174 and the final drying at 178 is of superior quality.

It will be understood that this invention is susceptible to modification in order to adopt it to different usages and conditions and accordingly, it is desired to comprehend such modifications within this invention as may fall within the scope of the appended claims.

I claim:

1. Glass paper consisting of glass fibers of predetermined diameter in which some of the fibers have a diameter which is an even numbered multiple of others of the fibers and an odd numbered multiple of still others of the fibers and such that the fiber diameters substantially all are in the range of 4:3:2:1, the fibers of all sizes having a substantially complete orientation and all of the fibers having a diameter which is not greater than one micron.

2. Glass paper consisting of glass fibers of predetermined diameter in which some of the fibers have a diameter which is an even numbered multiple of others of the fibers and such that the fiber diameters substantially all are in the range of 4:2:1, the fibers of all sizes having a substantially complete orientation and all of the fibers having a diameter which is not greater than one micron.

3. Glass paper consisting of glass fibers of predetermined diameter in which some of the fibers have an odd-numbered multiple of others of the fibers and such that the fiber diameters substantially all are in the range of 3:2, the fibers of all sizes having a substantially complete orientation and all of the fibers having a diameter which is not greater than one micron.

References Cited in the file of this patent

UNITED STATES PATENTS 2,658,848    Labino _____ Nov. 10, 1953